July 13, 1926.

J. B. MORROW

HEAT DEFLECTOR

Filed April 19, 1924

1,592,041

INVENTOR
JAMES B. MORROW.
BY
Harry C. Schroeder
ATTORNEY.

Patented July 13, 1926.

1,592,041

UNITED STATES PATENT OFFICE.

JAMES B. MORROW, OF OAKLAND, CALIFORNIA.

HEAT DEFLECTOR.

Application filed April 19, 1924. Serial No. 707,625.

My invention is an improved heat deflector particularly applicable to portable oil heaters.

The object of my invention is to provide a deflector which is a component part of the heater.

Another object is to provide a deflector, simple in construction, inexpensive to manufacture, and efficient in operation.

In the accompanying drawing in which my invention is illustrated:

Figure 1:
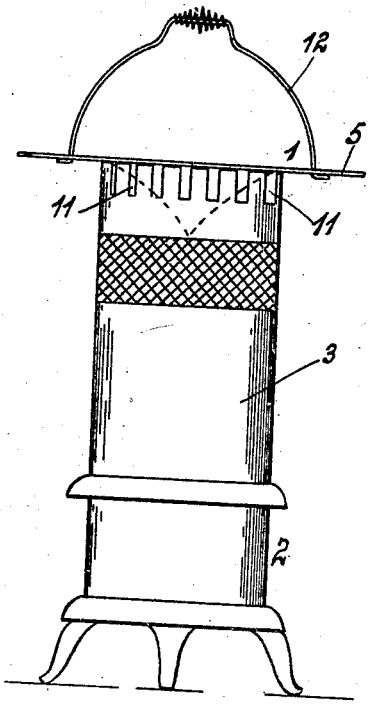
Figure 1 is a side view of a heater with my deflector mounted thereon.
Figure 2:
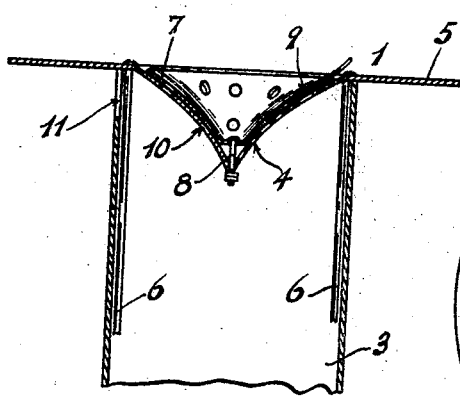
Figure 2 is a fragmentary sectional view of a heater, and deflector.
Figure 3:
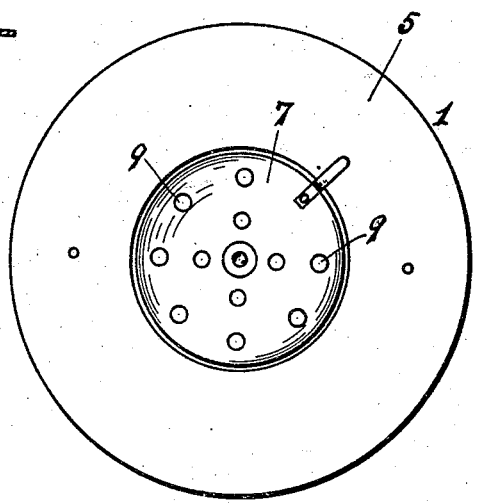
Figure 3 is a plan view of my deflector.

Referring more particularly to the drawing, my deflector 1 may be used with any well known type of oil heater 2, and is adapted to be mounted on the top of the drum 3 thereof.

My deflector comprises a baffle cone 4 positioned within the drum 3 and with its apex pointing downwards. A rim 5 is formed on the cone 4, and projects beyond the drum 3. The rim 5 and cone 4 may be formed in one piece or two as desired, or as is found practicable in manufacture. The deflector 1 is secured to the heater 2 by bolts 6, which extend through the deflector and are suitably secured to the heater by means not shown.

A conical damper 7 is rotatably mounted within the cone 4, and is secured therein by a bolt 8. Ports 9 in the damper 7 are adapted to be rotated into registry with ports 10 in the cone 4, thus permitting some of the heated air to pass upwardly, without being deflected to the side.

Openings 11 are formed in the top of the drum 3 immediately under the rim 5. These permit free egress of the heated air deflected from the cone 4, and materially increases the efficiency of the heater. These openings prevent the forming of a "pocket" under the rim 5 which would tend to retard the free flow of heated air. A suitable bail 12 is secured to the rim 5, so that the heater may be carried about if desired.

Having described my invention, I claim:

1. In a portable heater, a drum having openings near the top thereof, a deflector secured to the top of the drum, said deflector comprising a conical baffle positioned within the drum, said baffle being provided with ports and a rim extending outwardly from the drum for a substantial distance in a horizontal plane.

2. In a portable heater, a drum having openings in its walls adjacent its top, a deflector secured to said heater, said deflector comprising a conical baffle positioned within the drum and having a port therein, means for opening and closing said port, and a rim extending outwardly from the drum for a substantial distance in a horizontal plane.

In testimony whereof I affix my signature.

JAMES B. MORROW.